United States Patent
Matsuo

(10) Patent No.: US 11,697,356 B2
(45) Date of Patent: Jul. 11, 2023

(54) FUEL CELL SYSTEM

(71) Applicant: TOYOTA JIDOSHA KABUSHIKI KAISHA, Toyota (JP)

(72) Inventor: Junichi Matsuo, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/319,261

(22) Filed: May 13, 2021

(65) Prior Publication Data

US 2021/0362620 A1    Nov. 25, 2021

(30) Foreign Application Priority Data

May 22, 2020 (JP) ................. 2020-089686

(51) Int. Cl.
| | |
|---|---|
| B60L 58/12 | (2019.01) |
| H01M 8/04701 | (2016.01) |
| H01M 8/04746 | (2016.01) |
| B60L 58/40 | (2019.01) |
| H01M 8/04858 | (2016.01) |

(52) U.S. Cl.
CPC .............. B60L 58/12 (2019.02); B60L 58/40 (2019.02); H01M 8/0494 (2013.01); H01M 8/04708 (2013.01); H01M 8/04753 (2013.01); H01M 2250/20 (2013.01)

(58) Field of Classification Search
CPC ................................. B60L 58/12; B60L 58/40
See application file for complete search history.

(56) References Cited

U.S. PATENT DOCUMENTS

| | | |
|---|---|---|
| 2014/0087285 A1 | 3/2014 | Kumada et al. |
| 2018/0236883 A1 | 8/2018 | Kokubo et al. |

FOREIGN PATENT DOCUMENTS

| | | | |
|---|---|---|---|
| DE | 102018218331 A1 | * | 4/2020 |
| JP | 2005044749 A | | 2/2005 |
| JP | 2012244721 A | | 12/2012 |
| JP | 2013101844 A | | 5/2013 |
| JP | 2018137855 A | | 8/2018 |

OTHER PUBLICATIONS

Markus et al., DE 10 2018 218 331 A1 Espacenet machine translation, 2018 (Year: 2018).*

* cited by examiner

*Primary Examiner* — Adam A Arciero
(74) *Attorney, Agent, or Firm* — Dickinson Wright, PLLC

(57) ABSTRACT

A fuel cell system installed in a vehicle, the system comprising: a fuel cell, a secondary cell, a temperature acquirer for acquiring a temperature of the fuel cell, a state-of-charge value acquirer for acquiring a state-of-charge-value of the secondary cell, an outside temperature acquirer for acquiring an outside temperature, an outside pressure acquirer for acquiring an outside pressure, and a controller for controlling power of the secondary cell, wherein, when the temperature of the fuel cell exceeds a predetermined temperature, when the state-of-charge value of the secondary cell is a predetermined threshold value or more, when the outside temperature is a predetermined temperature or more, and when the outside pressure is a predetermined pressure or less, the controller increases the power of the secondary cell larger than power required of the secondary cell for normal running of the vehicle.

2 Claims, 2 Drawing Sheets

FUEL CELL SYSTEM

TECHNICAL FIELD

The disclosure relates to a fuel cell system.

BACKGROUND

A fuel cell (FC) is a power generation device that generates electrical energy by electrochemical reaction between hydrogen ($H_2$), which serves as fuel gas, and oxygen ($O_2$), which serves as oxidant gas, in a fuel cell stack (hereinafter, it may be simply referred to as "stack") composed of stacked unit fuel cells (hereinafter may be referred to as cells). Hereinafter, fuel gas and oxidant gas may be collectively and simply referred to as "reaction gas" or "gas".

In general, the unit fuel cells are composed of a membrane electrode assembly (MEA) and, as needed, two separators sandwiching the membrane electrode assembly.

The membrane electrode assembly has such a structure, that a catalyst layer and a gas diffusion layer are formed in this order on both surfaces of a solid polymer electrolyte membrane having proton ($H^+$) conductivity (hereinafter, it may be simply referred to as "electrolyte membrane"). Accordingly, the membrane electrode assembly may be referred to as "membrane electrode gas diffusion layer assembly" (MEGA).

In general, the separators have such a structure that a groove is formed as a reaction gas flow path on a surface in contact with the gas diffusion layer. The separators function as a collector of generated electricity.

In the fuel electrode (anode) of the fuel cell, the hydrogen supplied from the gas flow path and the gas diffusion layer is protonated by the catalytic activity of the catalyst layer, and the protonated hydrogen goes to the oxidant electrode (cathode) through the electrolyte membrane. An electron is generated at the same time, and it passes through an external circuit, do work, and then goes to the cathode. The oxygen supplied to the cathode reacts with the proton and electron on the cathode, thereby generating water.

The generated water provides the electrolyte membrane with appropriate moisture. Redundant water penetrates the gas diffusion layer and then is discharged to the outside of the system.

There has been considerable research on a fuel cell system which is installed and used in a fuel cell vehicle (hereinafter may be simply referred to as "vehicle").

For example, Patent Literature 1 discloses such a fuel cell vehicle, that the secondary cell is charged when it is predicted that the fuel cell vehicle is to travel on an uphill road, and at least a part of electric power supplied to the drive motor when the vehicle travels on an uphill road, is supplied from the secondary battery, thereby restraining the fuel cell from entering a high temperature state.

Patent Literature 2 discloses such a fuel cell vehicle, that after the fuel cell is detected to be in a high temperature state, the voltage of the fuel cell is temporarily dropped, and the amount of water generated in the fuel cell is increased, whereby the content of the temporal voltage drop processing is changed depending on the secondary cell charging state and the fuel cell operation state.

Patent Literature 1: Japanese Patent Application Laid-Open (JP-A) No. 2018-137855
Patent Literature 2: JP-A No. 2013-101844

When the temperature of the fuel cell is too high, the fuel cell is overdried. Due to the overdrying, the resistance of the fuel cell increases to decrease the power generation efficiency. Along with the increase in the resistance of the fuel cell, the amount of heat generated by the fuel cell increases. As a result, there is a problem in that the durability of the fuel cell decreases.

SUMMARY

The disclosed embodiments were achieved in light of the above circumstances. An object of the disclosed embodiments is to provide a fuel cell system in which the durability of the fuel cell at high temperature is high.

In a first embodiment, there is provided a fuel cell system installed in a vehicle, the system comprising:
 a fuel cell,
 a secondary cell,
 a temperature acquirer for acquiring a temperature of the fuel cell,
 a state-of-charge value acquirer for acquiring a state-of-charge-value of the secondary cell,
 an outside temperature acquirer for acquiring an outside temperature,
 an outside pressure acquirer for acquiring an outside pressure, and
 a controller for controlling power of the secondary cell,
 wherein, when the temperature of the fuel cell exceeds a predetermined temperature, when the state-of-charge value of the secondary cell is a predetermined threshold value or more, when the outside temperature is a predetermined temperature or more, and when the outside pressure is a predetermined pressure or less, the controller increases the power of the secondary cell larger than power required of the secondary cell for normal running of the vehicle.

The controller may determine the power of the secondary cell so that the temperature of the fuel cell reaches the predetermined temperature.

The predetermined temperature of the fuel cell may be a temperature at which power generation efficiency of the fuel cell is maximum.

According to the fuel cell system, the durability of the fuel cell at high temperature is increased.

BRIEF DESCRIPTION OF THE DRAWINGS

In the accompanying drawings.

DETAILED DESCRIPTION

Figure 1:
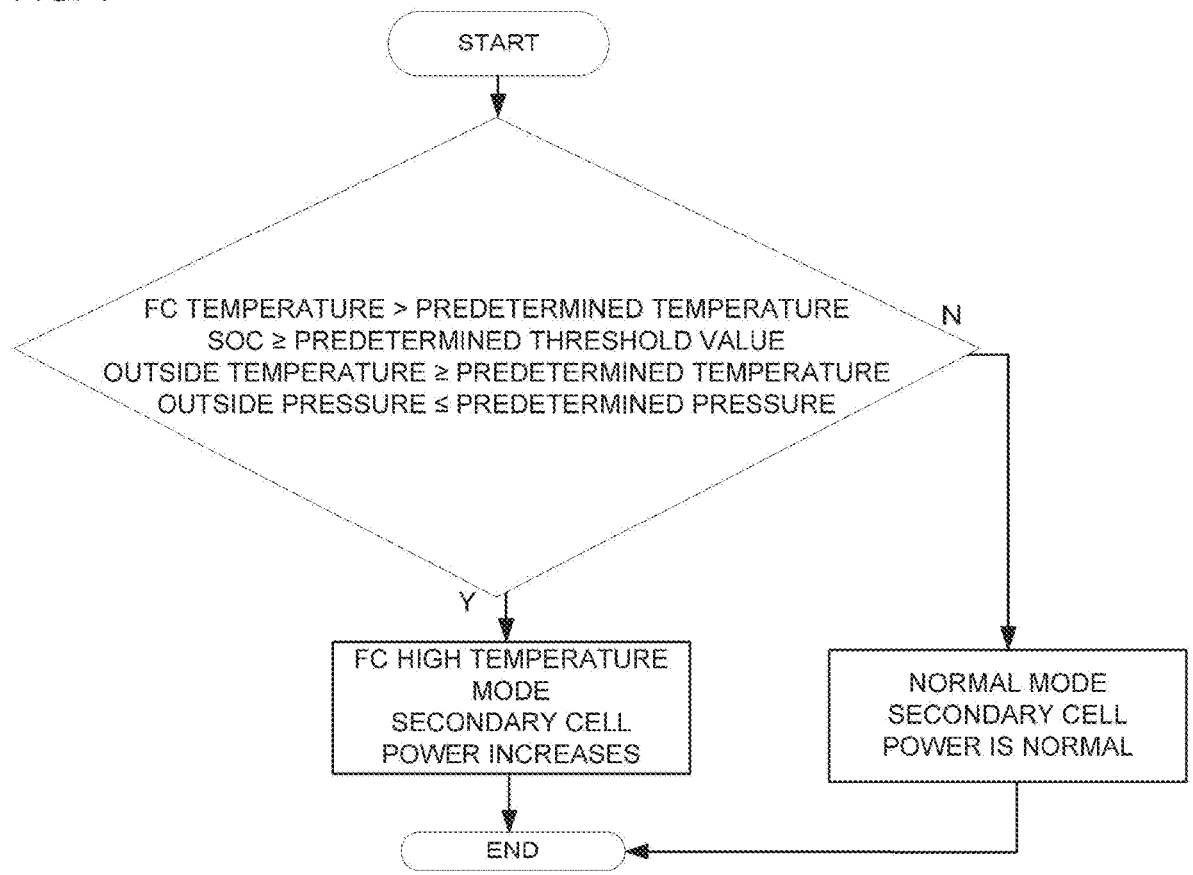
FIG. 1 is the flow chart of an example of the method for controlling the fuel cell system of the disclosed embodiments.

The fuel cell system of the disclosed embodiments is a fuel cell system installed in a vehicle, the system comprising:
 a fuel cell,
 a secondary cell,
 a temperature acquirer for acquiring a temperature of the fuel cell,
 a state-of-charge value acquirer for acquiring a state-of-charge-value of the secondary cell, an outside temperature acquirer for acquiring an outside temperature, an outside pressure acquirer for acquiring an outside pressure, and a controller for controlling power of the secondary cell, wherein, when the temperature of the fuel cell exceeds a predetermined temperature, when the state-of-charge value of the secondary cell is a predetermined threshold value or more, when the outside temperature is a predetermined temperature or more, and when the outside pressure is a predetermined pressure or less, the controller increases the power of the secondary cell larger than power required of the secondary cell for normal running of the vehicle.

When the temperature of the fuel cell is increased by insufficient cooling performance, etc., the fuel cell is over-dried. Due to the overdrying, the resistance of the fuel cell increases to decrease the power generation efficiency. Along with the increase in the resistance of the fuel cell, the amount of heat generated by the fuel cell increases. As a result, the durability of the fuel cell decreases.

The increase in the FC temperature may occur when, for example, large power generation is required by the vehicle and a region with a large loss of FC power generation is continuously used (e.g., when the vehicle runs uphill).

Also, the increase in the FC temperature occurs in the following cases, for example: when, due to high outside temperature, there is a small temperature difference between the outside temperature and the cooling water temperature of the FC, and the heat dissipation capability of the cooling water in the radiator of a cooling system decreases, and when, due to low outside pressure, heat exchange efficiency between the oxidant gas (e.g., air) and the cooling water in the intercooler decreases.

In the disclosed embodiments, when the FC is at high temperature, the power supplied from the secondary cell is temporarily increased to decrease the power generation load of the FC, thereby increasing the durability of the FC.

The fuel cell system of the disclosed embodiments comprises at least the fuel cell, the secondary cell, the temperature acquirer for acquiring the temperature of the fuel cell, the state-of-charge (SOC) value acquirer for acquiring the state-of-charge-value of the secondary cell, the outside temperature acquirer for acquiring the outside temperature, the outside pressure acquirer for acquiring the outside pressure, and the controller for controlling the power of the secondary cell.

In general, the fuel cell system of the disclosed embodiments is installed and used in a fuel cell vehicle that uses a motor as a driving source.

Also, the fuel cell system of the disclosed embodiments may be installed and used in a vehicle that can be, even if the fuel cell cannot generate power at the start-up the vehicle, run by the power of the secondary cell.

The motor is not particularly limited. It may be a conventionally-known drive motor.

The fuel cell may be a fuel cell stack composed of stacked unit fuel cells.

The number of the stacked unit fuel cells is not particularly limited. For example, two to several hundred unit fuel cells may be stacked, or 2 to 200 unit fuel cells may be stacked.

The fuel cell stack may include an end plate at both stacking-direction ends of each unit fuel cell.

Each unit fuel cell includes at least a membrane electrode assembly including an oxidant electrode, an electrolyte membrane and a fuel electrode. As needed, it may include two separators sandwiching the membrane electrode assembly.

The separators may have a reaction gas flow path on a surface in contact with a gas diffusion layer. Also, on an opposite surface to the surface in contact with the gas diffusion layer, the separators may have a refrigerant flow path for keeping the fuel cell temperature at a constant level.

The separators may have supply and discharge holes for delivering the reaction gas and the refrigerant in the unit cell stacking direction.

As the supply hole, examples include, but are not limited to, a fuel gas supply hole, an oxidant gas supply hole and a refrigerant supply hole.

As the discharge hole, example include, but are not limited to, a fuel gas discharge hole, an oxidant gas discharge hole and a refrigerant discharge hole.

The separators may be a gas-impermeable, electroconductive member, etc. As the electroconductive member, examples include, but are not limited to, gas-impermeable dense carbon obtained by carbon densification, and a metal plate (such as an iron plate, an aluminum plate and a stainless-steel plate) obtained by press molding. The separators may have a current collection function.

The fuel cell stack may have a manifold such as an inlet manifold communicating between the supply holes and an outlet manifold communicating between the discharge holes.

As the inlet manifold, examples include, but are not limited to, an anode inlet manifold, a cathode inlet manifold and a refrigerant inlet manifold.

As the outlet manifold, examples include, but are not limited to, an anode outlet manifold, a cathode outlet manifold and a refrigerant outlet manifold.

The oxidant electrode includes an oxidant electrode catalyst layer and a gas diffusion layer.

The fuel electrode includes a fuel electrode catalyst layer and a gas diffusion layer.

The oxidant electrode catalyst layer and the fuel electrode catalyst layer may contain a catalyst metal for accelerating an electrochemical reaction, a proton-conducting electrolyte, or electron-conducting carbon particles, for example.

As the catalyst metal, for example, platinum (Pt) or an alloy of Pt and another metal (such as Pt alloy mixed with cobalt, nickel or the like) may be used.

The electrolyte may be fluorine resin or the like. As the fluorine resin, for example, a Nafion solution may be used.

The catalyst metal is supported on carbon particles. In each catalyst layer, the carbon particles supporting the catalyst metal (i.e., catalyst particles) and the electrolyte may be mixed.

As the carbon particles for supporting the catalyst metal (i.e., supporting carbon particles), for example, water repellent carbon particles obtained by enhancing the water repellency of commercially-available carbon particles (carbon powder) by heating, may be used.

The gas diffusion layer may be a gas-permeable, electroconductive member or the like.

As the electroconductive member, examples include, but are not limited to, a porous carbon material such as carbon cloth and carbon paper, and a porous metal material such as metal mesh and foam metal.

The electrolyte membrane may be a solid polymer electrolyte membrane. As the solid polymer electrolyte membrane, examples include, but are not limited to, a hydrocarbon electrolyte membrane and a fluorine electrolyte membrane such as a moisture-containing, thin perfluorosulfonic acid membrane. The electrolyte membrane may be a Nafion membrane (manufactured by DuPont), for example.

The fuel cell system may include a reaction gas supplier for supplying reaction gas to the electrodes of the fuel cell.

The reaction gas supplier supplies reaction gas to the fuel cell stack.

The reaction gas encompasses fuel gas and oxidant gas.

As the reaction gas supplier, examples include, but are not limited to, a fuel gas supplier and an oxidant gas supplier. The fuel cell system may include any one of the suppliers, or it may include both of them.

The fuel cell system may include the fuel gas supplier for supplying fuel gas to the fuel electrode of the fuel cell.

The fuel gas is gas that mainly contains hydrogen. For example, it may be hydrogen gas.

As the fuel gas supplier, examples include, but are not limited to, a fuel tank such as a liquid hydrogen tank and a compressed hydrogen tank.

The fuel cell system may include a fuel gas supply flow path.

The fuel gas supply flow path connects the fuel cell to the fuel gas supplier and enables the supply of fuel gas from the fuel gas supplier to the fuel electrode of the fuel cell.

The fuel cell system may include a circulation flow path.

The circulation flow path enables that fuel off-gas discharged from the fuel electrode of the fuel cell is recovered and returned as circulation gas to the fuel electrode of the fuel cell.

The fuel off-gas contains the following, for example: fuel gas which passed through the fuel electrode while remaining unreacted, moisture which is water generated at the oxidant electrode and delivered to the fuel electrode, and oxidant gas which may be supplied to the fuel electrode during a purge.

As needed, the circulation flow path of the fuel cell system may be provided with an ejector, a circulation pump for controlling the flow rate of the circulation gas (such as a hydrogen pump), etc.

The circulation pump may be electrically connected to the controller, and the flow rate of the circulation gas may be controlled by controlling the turning on/off, rotational frequency, etc., of the circulation pump by the controller.

The ejector is disposed at the junction of the fuel gas supply flow path and the circulation flow path, for example. It supplies mixed gas containing the fuel gas and the circulation gas to the fuel electrode of the fuel cell. As the ejector, a conventionally-known ejector may be used.

The circulation flow path may be provided with a gas-liquid separator for reducing the moisture in the fuel off-gas. Also, the circulation flow path may be provided with a water discharge flow path that branches from the circulation flow path by the gas-liquid separator. The water discharge flow path may be provided with a water discharge valve.

The moisture separated from the fuel off-gas in the gas-liquid separator may be discharged by opening the water discharge valve of the water discharge flow path branching from the circulation flow path.

The water discharge valve may be electrically connected to the controller, and the amount of discharged liquid water may be controlled by controlling the opening and closing of the water discharge valve by the controller.

The fuel cell system may include a fuel off-gas discharger.

The fuel off-gas discharger enables the discharge of the fuel off-gas to the outside (the outside of the system). The outside may be the outside of the fuel cell system, or it may be the outside of the vehicle.

The fuel off-gas discharger may include a fuel off-gas discharge valve. As needed, it may further include a fuel off-gas discharge flow path.

The fuel off-gas discharge valve may be electrically connected to the controller, and the fuel off-gas discharge flow amount may be controlled by controlling the opening and closing of the fuel off-gas discharge valve by the controller.

The fuel off-gas discharge flow path may branch from the circulation flow path, for example. It enables the discharge of the fuel off-gas to the outside when the concentration of hydrogen in the fuel off-gas is too low.

The fuel cell system may include the oxidant gas supplier, an oxidant gas supply flow path, and an oxidant gas discharge flow path.

The oxidant gas supplier supplies oxidant gas to at least the oxidant electrode of the fuel cell.

As the oxidant gas supplier, for example, an air compressor may be used. The air compressor is driven by a control signal from the controller and introduces the oxidant gas to the cathode side (such as the oxidant electrode and the cathode inlet manifold) of the fuel cell.

The oxidant gas supply flow path connects the oxidant gas supplier to the fuel cell and enables the supply of oxidant gas from the oxidant gas supplier to the oxidant electrode of the fuel cell.

The oxidant gas is oxygen-containing gas. It may be air, dry air, pure oxygen or the like.

The oxidant gas discharge flow path enables the discharge of the oxidant gas from the oxidant electrode of the fuel cell.

The oxidant gas discharge flow path may be provided with an oxidant gas pressure control valve.

The oxidant gas pressure control valve is electrically connected to the controller. By opening the oxidant gas pressure control valve by the controller, reacted cathode off-gas is discharged from the oxidant gas discharge flow path. By controlling the opening degree of the oxidant gas pressure control valve, the pressure of the oxidant gas supplied to the oxidant electrode (cathode pressure) can be controlled.

The oxidant gas supply flow path may be provided with an intercooler. The intercooler is connected to a refrigerant circulation flow path to exchange heat with the refrigerant and cool down the oxidant gas discharged from the oxidant gas supplier. When it is required to warm up the fuel cell (a power generation pretreatment), the oxidant gas is compressed by the oxidant gas supplier to increase the temperature thereof, and the temperature of the refrigerant is increased by the heat of the oxidant gas.

The fuel cell system may include a bypass flow path which branches from the oxidant gas supply flow path at the downstream side of the intercooler, bypasses the fuel cell, and then is connected to the oxidant gas discharge flow path. The bypass flow path is provided with a bypass valve for controlling the opening state of the bypass flow path. The bypass valve is electrically connected to the controller, and it is opened by the controller when the power of the secondary cell is consumed by driving the oxidant gas supplier in the state where, for example, the charge capacity of the secondary cell is not sufficient at the time of regenerative power generation by the drive motor. Accordingly, the oxidant gas is discharged into the oxidant gas discharge flow path and is not delivered to the fuel cell.

The fuel gas supply flow path and the oxidant gas supply flow path may be connected via a joining flow path. The joining flow path may be provided with a purge valve.

The purge valve may be electrically connected to the controller, and by opening the purge valve by the controller, the oxidant gas in the oxidant gas supplier may be allowed to flow into the fuel gas supply flow path as purge gas.

The purge gas is used for purging, and it may be reaction gas. The reaction gas may be fuel gas, oxidant gas or mixed reaction gas containing them.

The fuel cell system may include a refrigerant supplier and a refrigerant circulation flow path as the cooling system of the fuel cell.

The refrigerant circulation flow path communicates between the refrigerant supply hole and refrigerant discharge hole installed in the fuel cell, circulates the refrigerant supplied from the refrigerant supplier in and out of the fuel cell, and enables the cooling of the fuel cell.

As the refrigerant supplier, examples include, but are not limited to, a cooling water pump.

The refrigerant circulation flow path may be provided with a radiator for heat dissipation from cooling water.

As the cooling water (refrigerant), for example, a mixed solution of ethylene glycol and water may be used to prevent freezing at low temperature.

The fuel cell system may include the secondary cell.

The secondary cell (battery) needs to be a chargeable and dischargeable cell. For example, the secondary cell may be a conventionally-known secondary cell such as a nickel-hydrogen secondary cell and a lithium ion secondary cell. The secondary cell may include a power storage element such as an electric double layer capacitor. The secondary cell may have a structure such that a plurality of secondary cells are connected in series. The secondary cell supplies power to the motor, the oxidant gas supplier such as the air compressor, etc. The secondary cell may be chargeable by a power source outside the vehicle, such as a household power source. The secondary cell may be charged by the output power of the fuel cell.

The fuel cell system may include an auxiliary instrument that uses the battery as a power source.

As the auxiliary instrument, examples include, but are not limited to, a lighting instrument for vehicles and an air-conditioning instrument for vehicles.

Also, a state-of-charge value acquirer for detecting the state-of-charge (SOC) value of the secondary cell may be installed in the fuel cell system of the disclosed embodiments.

The state-of-charge value acquirer detects the state-of-charge (SOC) value of the secondary cell.

The state-of-charge value acquirer may be connected to the controller. The controller may be configured to detect the state-of-charge value of the secondary cell by the output of the state-of-charge value acquirer.

The state-of-charge value acquirer may be a conventionally-known charge state sensor, etc.

The controller may manage the state-of-charge value of the secondary cell and may control the charge and discharge of the secondary cell.

The state of charge (SOC) value means the percentage of the charge capacity with respect to the full charge capacity of the secondary cell. The full charge capacity is a SOC of 100%.

The temperature acquirer acquires the temperature of the fuel cell.

The temperature acquirer may be connected to the controller. The controller may be configured to detect the temperature of the fuel cell by the output of the temperature acquirer.

The temperature acquirer may be a conventionally-known temperature sensor, etc.

The temperature of the fuel cell may be the temperature of the cooling water used to cool down the fuel cell.

The outside temperature acquirer acquires the outside temperature.

The outside temperature acquirer may be connected to the controller. The controller may be configured to detect the outside temperature by the output of the outside temperature acquirer.

The outside temperature acquirer may be a conventionally-known outside temperature sensor, etc.

The outside pressure acquirer acquires the outside pressure.

The outside pressure acquirer may be connected to the controller. The controller may be configured to detect the outside pressure by the output of the outside pressure acquirer.

The outside pressure acquirer may be a conventionally-known outside pressure sensor, etc.

The controller controls at least the power of the secondary cell.

The controller may be connected to the gas-liquid separator, the water discharge valve, the fuel off-gas discharge valve, the oxidant gas pressure control valve, the purge valve, the fuel gas supplier, the oxidant gas supplier, the bypass valve, the secondary cell, the circulation pump, the state-of-charge value acquirer, the temperature acquirer, the outside temperature acquirer, the outside pressure acquirer and so on through an input-output interface. Also, the controller may be electrically connected to an ignition switch that may be installed in the vehicle.

The controller physically includes a processing unit such as a central processing unit (CPU), a memory device such as a read-only memory (ROM) and a random access memory (RAM), and the input-output interface, for example. The ROM is used to store a control program, control data and so on processed by the CPU, and the RAM is mainly used as various workspaces for control processes. Also, the controller may be a control device such as an engine control unit (ECU).

FIG. 1 is the flow chart of an example of the method for controlling the fuel cell system of the disclosed embodiments. The disclosed embodiments are not limited to this typical example.

When the temperature of the fuel cell exceeds the predetermined temperature, when the state-of-charge value of the secondary cell is the predetermined threshold value or more, when the outside temperature is the predetermined temperature or more, and when the outside pressure is the predetermined pressure or less, the controller increases the power of the secondary cell larger than the power required of the secondary cell for normal running of the vehicle (a FC high temperature mode).

When the temperature of the fuel cell is the predetermined temperature or less, when the state-of-charge value of the secondary cell is less than the predetermined threshold value, when the outside temperature is less than the predetermined temperature, or when the outside pressure exceeds the predetermined pressure, the controller sets the power of the secondary cell to the power required of the secondary cell for normal running of the vehicle (a normal mode). Then, the controller terminates the control.

In the FC high temperature mode, the controller may set the power of the secondary cell larger than the power required of the secondary cell for normal running of the vehicle so that the temperature of the fuel cell reaches the predetermined temperature. Accordingly, the power of the secondary cell is determined so that the temperature of the fuel cell can be kept at the constant temperature. Accordingly, power can be efficiently obtained from the fuel cell.

The predetermined temperature of the fuel cell may be the temperature at which the power generation efficiency of the fuel cell is maximum. Accordingly, power can be most efficiently obtained from the fuel cell.

The predetermined threshold value of the state-of-charge value of the secondary cell is not particularly limited. It may be appropriately determined so as not to cause a running failure of the vehicle.

Even when the temperature of the fuel cell exceeds the predetermined temperature, if the state-of-charge value of the secondary cell is less than the predetermined threshold value, the power that the secondary cell can output is not sufficient. Accordingly, it is not necessary to carry out the FC high temperature mode.

In the FC high temperature mode, the power of the secondary cell is not particularly limited, as long as the power of the secondary cell is set to be larger than the power required of the secondary cell for normal running of the vehicle.

However, when the current state-of-charge value of the secondary cell is smaller than the energy required by the vehicle, the upper and lower limits of the state-of-charge value, which corresponds to the energy that the secondary cell may output, may be set in advance so as not to deplete the state-of-charge value of the secondary cell and cause a running failure of the vehicle.

Then, the power required of the FC may be calculated from the difference between the power required by the vehicle and the power that the secondary cell can output, and the power may be generated by the FC.

Figure 2:
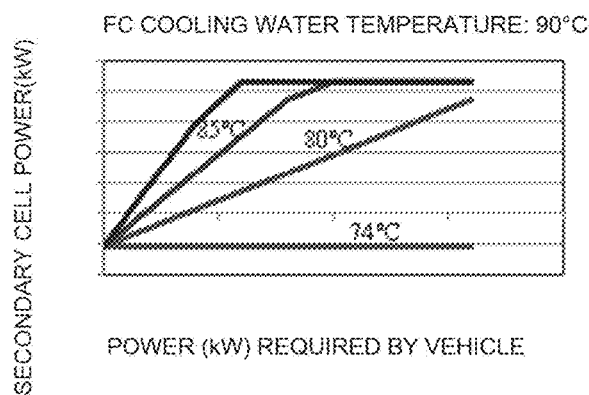
FIG. 2 is a view showing an example of the relationship between the power required by the vehicle, the power of the secondary cell, and the FC temperature (water temperature: cooling water temperature)

FIG. 2 is a view showing an example of the relationship between the power required by the vehicle, the power of the secondary cell, and the FC temperature (water temperature: cooling water temperature). As shown in FIG. 2, the power required of the secondary cell when the FC is at high temperature, may be determined as follows: for example, the worst uphill pattern in which the FC temperature increases (such as outside temperature and pressure conditions) is defined, and the power required of the secondary cell when the FC is at high temperature, is determined so that the temperature (such as cooling water temperature) of the FC in the worst uphill pattern can maintain the temperature at which the power generation efficiency of the FC is maximum (such as 80° C.).

In the disclosed embodiments, the case when the outside temperature is the predetermined temperature or more and the case when the outside pressure is the predetermined pressure or less, indicate a condition in which the cooling performance of the FC decreases.

When the outside temperature is the predetermined temperature or more, the difference between the outside temperature and the cooling water temperature of the FC is small; the heat dissipation capability of the cooling water in the radiator of the cooling system, decreases; and the FC temperature increases.

The predetermined temperature of the outside temperature is not particularly limited. For example, it may be determined from a data group showing the relationship between the outside temperature, the outside pressure and the cooling water temperature of the FC, which are temperatures measured in advance.

When the outside pressure is the predetermined pressure or less, a pressure difference between the outside pressure and the oxidant gas (such as high-pressure air) supplied from the oxidant gas supplier (such as the air compressor) increases, and the density of the oxidant gas decreases. Accordingly, the heat exchange efficiency between the oxidant gas and the cooling water in the radiator through the intercooler decreases, and the FC temperature increases.

The predetermined pressure of the outside pressure is not particularly limited. For example, it may be determined from the data group showing the relationship between the outside temperature, the outside pressure and the cooling water temperature of the FC, which are temperatures measured in advance.

Figure 3:
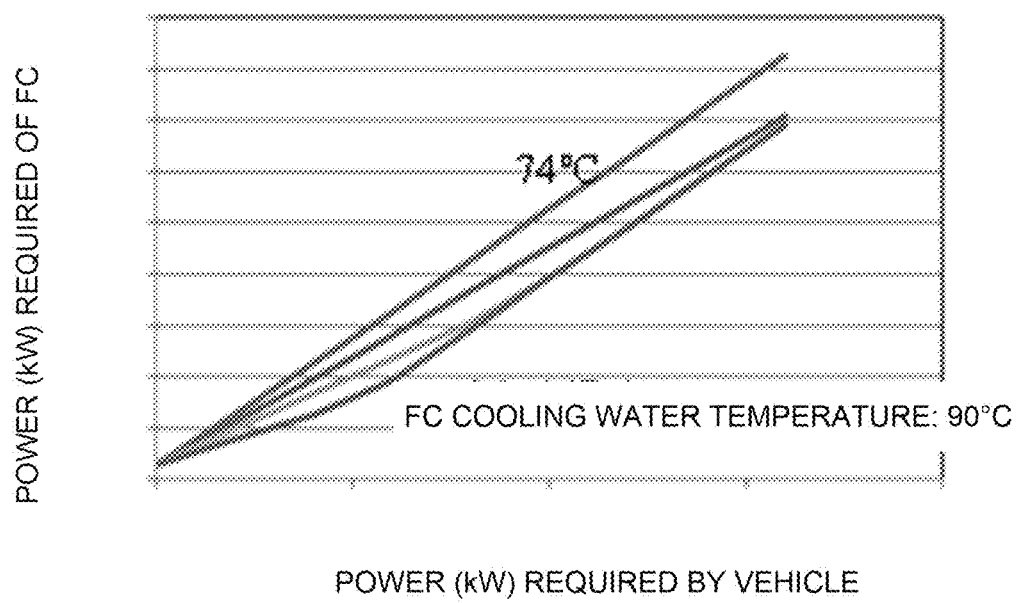
FIG. 3 is a view showing an example of the relationship between the power required by the vehicle, the power required of the FC, and the FC temperature (water temperature: cooling water temperature).

FIG. 3 is a view showing an example of the relationship between the power required by the vehicle, the power required of the FC, and the FC temperature (water temperature: cooling water temperature).

The power required of the FC can be calculated from the difference between the power required by the vehicle and the power that the secondary cell can output.

The invention claimed is:

1. A fuel cell system installed in a vehicle, the system comprising:
a fuel cell,
a secondary cell,
a temperature acquirer for acquiring a temperature of the fuel cell,
a state-of-charge value acquirer for acquiring a state-of-charge-value of the secondary cell,
an outside temperature acquirer for acquiring an outside temperature,
an outside pressure acquirer for acquiring an outside pressure,
a controller for controlling power of the secondary cell, and
a memory storing a data group showing the relationship between the outside temperature, the outside pressure and a cooling water temperature of the fuel cell, which are measured in advance
wherein, when the temperature of the fuel cell exceeds a predetermined temperature, when the state-of-charge value of the secondary cell is a predetermined threshold value or more, when the outside temperature is a predetermined temperature or more, and when the outside pressure is a predetermined pressure or less, the controller increases the power of the secondary cell larger than power required of the secondary cell for normal running of the vehicle;
wherein the controller determines the power of the secondary cell so that the temperature of the fuel cell reaches the predetermined temperature;
wherein the predetermined temperature of the fuel cell is a temperature at which power generation efficiency of the fuel cell is maximum; and
wherein the predetermined temperature of the outside temperature and the predetermined pressure of the outside pressure are determined from the data group.

2. The fuel cell system of claim 1, wherein a power required of the fuel cell is calculated from the difference between a power required by the vehicle and the power that the secondary cell can output, and the power required of the fuel cell is generated by the fuel cell.

* * * * *